United States Patent [19]

Przelomski et al.

[11] Patent Number: 5,407,691
[45] Date of Patent: Apr. 18, 1995

[54] CHOCOLATE CANDY IMPRINTING PROCESS

[75] Inventors: Cheryl L. Przelomski, Wilmington; Dennis R. Cowan, Middletown, both of Del.

[73] Assignee: The Planning Factory, Inc., Wilmington, Del.

[21] Appl. No.: 946,055

[22] Filed: Sep. 16, 1992

[51] Int. Cl.⁶ ............................................. A23L 1/27
[52] U.S. Cl. .................................... 426/249; 426/660
[58] Field of Search ............... 426/104, 249, 660, 106

[56] References Cited

U.S. PATENT DOCUMENTS 3,545,981  12/1970  Klein et al. ........................ 426/249
4,778,683  10/1988  Newsteder ......................... 426/249
4,946,696   8/1990  Nendl et al. ....................... 426/660

FOREIGN PATENT DOCUMENTS 272768   6/1988  European Pat. Off. ............ 426/104
3301746  5/1987  Japan ................................. 426/249
2138140  6/1987  Japan ................................. 426/104

Primary Examiner—Robert A. Dawson
Assistant Examiner—W. L. Walker
Attorney, Agent, or Firm—Nath, Amberly & Associates

[57] ABSTRACT

A method for making candy in which a high-resolution image of edible material is imprinted on another edible material, both of which are, in the preferred embodiment, chocolate. The invention includes steps of measuring heated chocolate into a mold, and allowing it to cool to a proper temperature. A screen mesh is laid over partially cooled chocolate pieces, and another chocolate, preferably of a different color than the chocolate pieces, is applied through the mesh. By using a proper combination of materials and conditions, a highly pleasing image is formed, supporting the attractiveness of the resulting candy, especially as a novelty item or souvenir.

5 Claims, 2 Drawing Sheets

CHOCOLATE CANDY IMPRINTING PROCESS

BACKGROUND OF THE INVENTION

1. Field of the Invention

The present invention relates to processes for making candy. More specifically, the invention relates to processes for making candy in which a decorative design made of chocolate is imprinted on a piece of candy.

2. Related Art

Various methods of applying images are known in the art. Further, some of these methods have been applied in the food preparation field.

For example, U.S. Pat. No. 5,017,394 (McPherson et al.) shows a system for silk screening edible images on a backing material and transferring the image to cake or the like. U.S. Pat. No. 4,946,696 (Nendl et al.) provides a system for applying an image pattern to the surface of a chocolate product. The image of cocoa butter and other ingredients is screened onto a backing material which forms one of the surfaces on which a chocolate body is formed. U.S. Pat. No. 4,369,200 (Iwao et al.) shows a system for marking chocolate or the like by molding and providing a stencil or plate with slits and holes through which the marking material is applied. These patents are incorporated herein by reference as if reproduced in full below.

None of these patents appear to avoid the use of a backing material before an edible image is applied. Also, previous systems have involved substantial difficulties in providing detailed, high-quality likenesses of visual images on products such as chocolate.

Therefore, there is a need in the art to provide a method by which detailed, high-resolution, high-quality images are applied to chocolate. It is especially desirable to provide an image which itself is made of chocolate.

SUMMARY OF THE INVENTION

The invention provides a solution to the aforementioned problems by providing a method for making candy in which a high-resolution image of edible material is imprinted on another edible material, both of which are, in the preferred embodiment, chocolate.

The invention includes steps of measuring heated chocolate into a mold, and allowing it to cool to a proper temperature. A screen mesh is laid over partially cooled chocolate pieces, and another chocolate, preferably of a different color than the chocolate pieces, is applied through the mesh. By using a proper combination of materials and conditions, a highly pleasing image is formed, supporting the attractiveness of the resulting candy, especially as a novelty item or souvenir.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
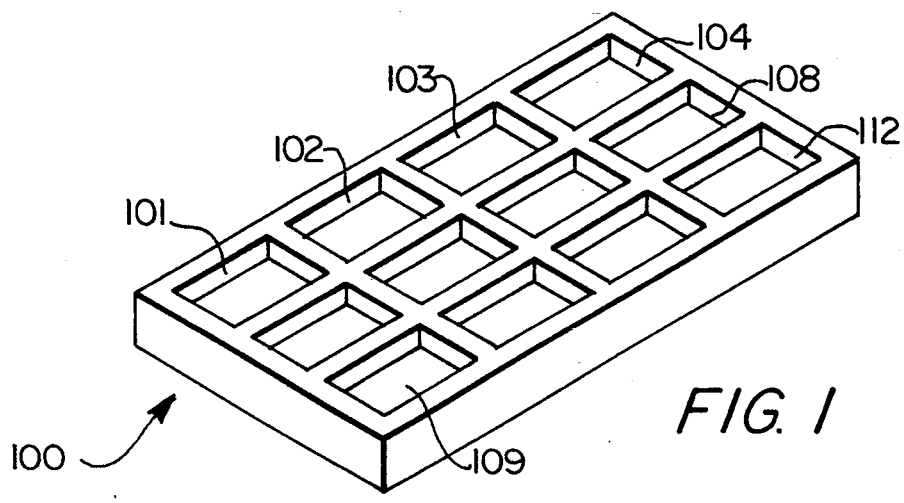
FIG. 1 illustrates an exemplary mold for receiving chocolate, in accordance with a preferred embodiment of the present invention.
Figure 2:
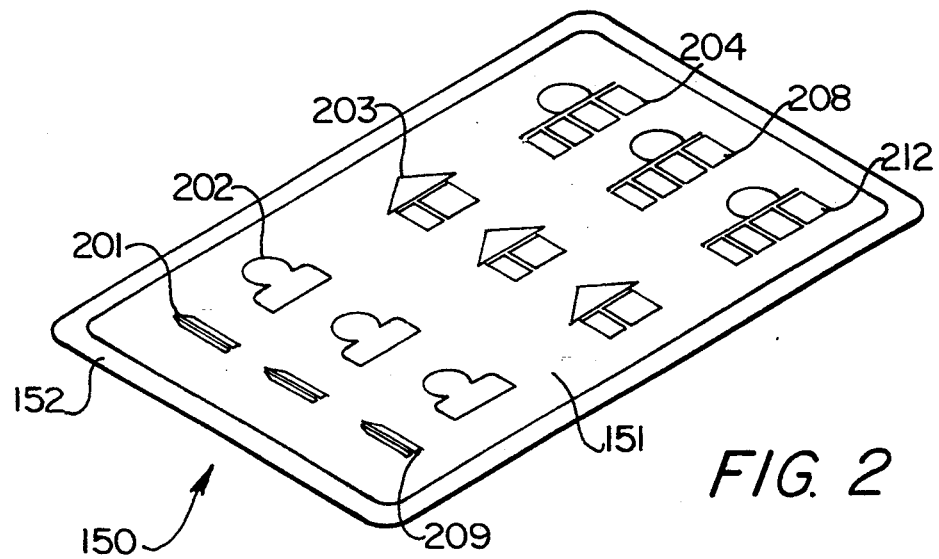
FIG. 2 illustrates a screen used for applying images to the chocolates.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

A preferred method begins with heating "white chocolate" to a temperature at which it can be easily poured into molds. A suitable mold is shown in FIG. 1, in which 12 substantially identical molds 101–112 are illustrated. The bottom surfaces of the molds are flat and smooth, so that a smooth flat surface 240 will be created on the chocolate pieces after they are removed. The heated "white chocolate" is carefully measured and poured into the molds. The first layer 244 is partially cooled.

Before the first layer 244 is completely cooled, a second layer 242 of chocolate (such as dark milk chocolate) is measured and poured atop the first layer. The second layer is then partially cooled.

Figure 3:
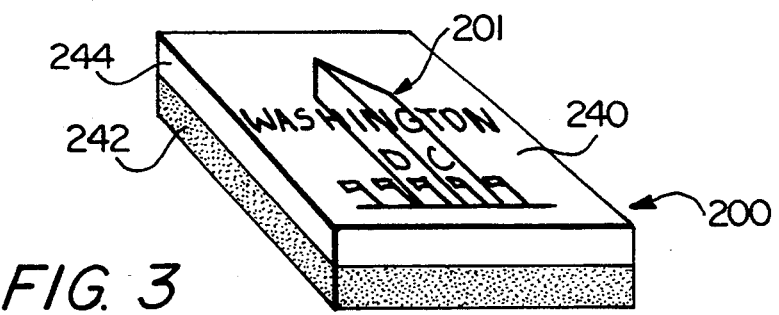
FIG. 3 illustrates a product formed by the preferred method, here, a piece of candy with an image of a monument imprinted on a top face thereof.
Figure 4:
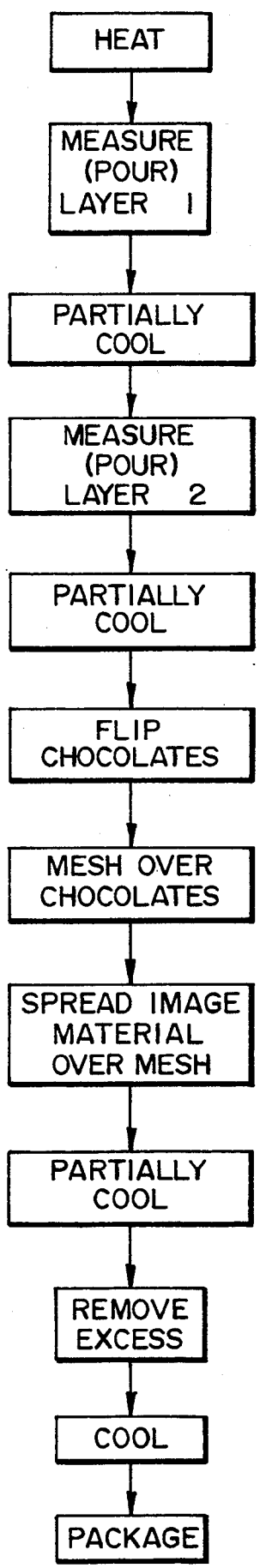
FIG. 4 is a flow chart illustrating in detail a preferred embodiment of the method according to the present invention.

The chocolates are flipped out of the mold, so the second layer 242 is beneath the first layer 244 and surface 240 is uppermost as shown in FIG. 3.

Then, a mesh 150 having the desired decorative patterns at suitable locations 201–212 over each chocolate is lowered atop the chocolates The "image material" such as a dark (for example, milk) chocolate, is spread over the mesh.

After the image is applied to surface 240, the mesh is removed, and the chocolates with the imprinted design are partially cooled. Excess chocolate is removed.

Finally, the product is cooled to a suitable temperature for packaging.

Details of a particular preferred process are described below.

The process starts with a mold tray 100 which includes 12 openings 101–112 for making a 2-inch×1½-inch piece of chocolate that is approximately ½-inch in depth. The openings are slightly trapezoidal in cross-section, to facilitate removal of the chocolates from the openings. As a result, the second layer 242 is wider than the first layer 244.

The chocolate is heated to a suitable temperature range so that it is in liquid form. Approximately two-thirds to three-fourths of each mold is filled with milk chocolate, for the purposes of taste. Any "white chocolate" is used mainly as a background for the printed image. A Hake melder and pump uses compressed air to precisely measure the amount of chocolate which is poured into each mold. This ensures same-width chocolate pieces, and same-height pieces for the screening process.

The chocolate then cools for a certain period of time, but before it is completely cooled, it is removed from the mold and the silk-screen mesh is placed over the chocolates. Milk chocolate is spread over and through the aluminum-framed mesh with a squeegee to create a design on the surface 240 of each of the twelve boa. The spread chocolate is kept from hardening, preferably by using a rheostat-controlled heat lamp over the mesh as the chocolate is being spread. The screening process is done before the chocolate is completely cooled so that the design holds better and the desired finish on the candy is created.

The screen process is distinct from typical silk screening for T-shirts. Changes must be made to apply the process to food. A 200-mesh monofilament screen 151 on an aluminum frame 152 is used. The emulsion put over the screen to form image patterns 201–212 is non-toxic and food-safe.

Modifications and variations of the above-described embodiments of the present invention are possible, as appreciated by those skilled in the art in light of the above teachings. For example, materials other than chocolate may be used. Also, there is no need to form a first layer of chocolate which is of a different color than the second layer; all that is desirable is that the imprinted design is somehow distinguishable from the surface on which it is printed, other features of the underlying chocolate being of secondary importance (except, of course, for aesthetic or other purposes known to those skilled in the art). The particular size, shape, composition, number and orientation of the various elements may readily be varied, while still remaining within the scope of the present invention. Finally, certain steps may in certain circumstances be omitted, supplemented, or changed in order, from that specifically disclosed. It is therefore to be understood that, within the scope of the appended claims and their equivalents, the invention may be practiced otherwise than as specifically described.

What is claimed is:

1. A method of making a chocolate product, comprising the steps of:
   (a) heating chocolate of a first color;
   (b) pouring a measured amount of the heated chocolate of the first color into a mold having a substantially flat surface to provide a chocolate body of the first color having a surface engaging said substantially flat mold surface;
   (c) imprinting an image on said surface of said chocolate body after cooling thereof by:
      (i) placing a mesh having a pattern over said surface of said chocolate body of the first color;
      (ii) spreading chocolate of a second color atop the mesh so as to print an image of the pattern on said surface of the chocolate body of the first color by passing some of said chocolate of a second color through said mesh; and
   (d) removing the mesh.

2. The method of claim 1, wherein said placing is the placing of a 200-mesh screen.

3. The process of claim 1, wherein said pouring is into mold having a substantially flat bottom surface.

4. A method of making a chocolate product, comprising the steps of:
   heating first chocolate of a first color;
   pouring a measured amount of the first chocolate into a mold;
   partially cooling the first chocolate;
   pouring a measured amount of a second chocolate of a second color into the mold atop the first chocolate;
   partially cooling the second chocolate;
   flipping the chocolates out of the mold;
   placing a mesh having a pattern over the first chocolate;
   spreading chocolate of a third color, which may be the same color as the second chocolate but is different than the color of the first chocolate, over the mesh and passing third color chocolate through said mesh so as to form an image of the pattern atop the first chocolate;
   partially cooling the two layers of chocolate with the imprinted image thereon;
   removing excess material from the partially cooled product;
   cooling the product; and
   packaging the product.

5. The method of claim 4, wherein said placing is the placing of a 200-mesh screen.

* * * * *